United States Patent [19]
Jacobs et al.

[11] Patent Number: 5,781,856
[45] Date of Patent: Jul. 14, 1998

[54] CONCENTRATED SUBSCRIBER SYSTEM FOR WIRELESS LOCAL LOOP

[75] Inventors: Paul E. Jacobs, La Jolla; Juan Faus; Martin N. Chang, both of San Diego, all of Calif.

[73] Assignee: Qualcomm Incorporated, San Diego, Calif.

[21] Appl. No.: 850,952

[22] Filed: May 5, 1997

Related U.S. Application Data

[63] Continuation of Ser. No. 384,291, Jan. 31, 1995, abandoned.

[51] Int. Cl.$^6$ .................... H04Q 7/20; H04Q 7/30
[52] U.S. Cl. .................... 455/403; 455/424; 455/425; 455/522; 455/574
[58] Field of Search ........................ 455/422, 403, 455/424, 425, 522, 517, 557, 561, 574

[56] References Cited

U.S. PATENT DOCUMENTS

| | | | |
|---|---|---|---|
| 4,658,096 | 4/1987 | West, Jr. et al. | 379/59 |
| 4,677,656 | 6/1987 | Burke et al. | 379/63 |
| 4,737,975 | 4/1988 | Shafer | 379/58 |
| 4,748,655 | 5/1988 | Thrower et al. | 379/58 |
| 4,775,997 | 10/1988 | West, Jr. et al. | 379/58 |
| 4,888,788 | 12/1989 | Teranishi et al. | |
| 4,890,315 | 12/1989 | Bendixen et al. | 379/59 |
| 4,901,307 | 2/1990 | Gilhousen et al. | 370/18 |
| 4,922,517 | 5/1990 | West, Jr. et al. | 379/58 |
| 5,103,459 | 4/1992 | Gilhousen et al. | 379/59 |
| 5,228,054 | 7/1993 | Rueth et al. | |

OTHER PUBLICATIONS

"Flexible Rural Systems", *Rural Telecommunications*, by T.J. Pereira et al., May 23-25, 1988.

"Radio Linked Exchange and Concentrator Rural Telephone System (RTS)", Defendant Exhibit (261), TM-517, 1975.

"Mar 801 (1604): Multi-Acess Radio System for Rural Telephony", *35 Telettra Review*, by J.L. Adanero et al., Nov. 1993.

"Lic. Sc. Math. Bell Telephone Mfg. Co.", *Cellular Radio Systems For Rural Radio Telecommunications*, by A. Liekens, Antwerp—Belgium.

*Primary Examiner*—Dwayne D. Bost
*Assistant Examiner*—Nay Maung
*Attorney, Agent, or Firm*—Russell B. Miller; Brian S. Edmonston

[57] ABSTRACT

A cellular telephone concentrated subscriber system is described. The concentrated subscriber system includes a set of subscriber units coupled to a concentrated subscriber system controller. The concentrated subscriber system controller that provides a radio frequency (RF) interface to the standard base station transceiver of a cellular telephone system. Each subscriber unit has a unique electronic serial number. The concentrated subscriber system controller includes a set of modulator-demodulator systems (modems) and a RF transceiver and antenna system that is configured to transmit sufficient information to conduct multiple telephone calls over both long and short distances. The concentrated subscriber system controller also includes control circuitry for coupling the set of subscriber unit to the set of modems via a multiplexed system using stored information. In the preferred embodiment the number of modems is significantly less the number of subscriber units which are implemented in a simplified manner so that the per user cost of cellular telephone service is reduced.

22 Claims, 3 Drawing Sheets

5,781,856

CONCENTRATED SUBSCRIBER SYSTEM FOR WIRELESS LOCAL LOOP

This is a Continuation of application Ser. No. 08/384,291, filed Jan. 31, 1995, abandoned.

BACKGROUND OF THE INVENTION

I. Field of the Invention

The present invention relates to wireless telephone systems. More particularly, the present invention relates to cellular telephone systems that provide reduced cost telephone service.

II. Description of the Related Art

Wire based, or "wire line," telephone systems are the traditional method of providing non-mobile telephone service. Wire based telephone systems are well suited for this task because they provide high quality telephone connections at a low operating cost, and can easily accommodate increased demand for telephone service by the introduction of new telephone wires into the existing network. A disadvantage of wire based telephone systems is the substantial infrastructure and capital necessary for their implementation. These requirements can make wire based telephone systems uneconomical for providing telephone service in areas that are remote or less populated, or in areas where the required capital is not available. The result is that less populated and developed areas often lack adequate telephone service. Also, the time necessary to put the required infrastructure in place makes wire based telephone systems less desirable in areas where new telephone service must be provided quickly.

Wireless cellular telephone systems require substantially less capital and infrastructure than wire based telephone systems and therefore provide a possible alternative for providing primary telephone service in areas where access to wire based telephone service is inadequate. The degree to which cellular telephone systems can provide primary telephone service is limited, however, by their higher operating cost as compared to wire based telephone systems, which creates a higher usage cost for the cellular telephone system subscriber. This higher usage cost limits the number of subscribers who can afford to use a cellular telephone system as their primary telephone service, and therefore reduces the number of markets in which the use of cellular telephone systems is economical.

A newly configured cellular telephone system that emphasized reduced operating cost, rather than mobility, could increase the number of areas in which it is both profitable and economical to use a cellular telephone system as a primary telephone service provider. The resulting increase access to telephone service would improve the lives of people in areas previously lacking adequate telephone service by allowing factories and other job producing organizations to locate in a greater variety of regions within a given country or region. Such a cellular telephone system would also be useful in areas where a wire based telephone system was not going to be available for a significant period of time, if the low capital cost and rapid implementation capability of the wireless system could be maintained. This would further increase world wide access to telephone service.

It would also be desirable to make such a reduce cost cellular telephone system as compatible as possible with existing cellular telephone protocols as this would reduce the cost of developing the system. Making such a cellular telephone system compatible with prior art cellular telephone systems would allow both lower cost, reduced mobility, cellular telephone service and higher cost, increased mobility, cellular telephone service using the same cellular telephone network. Since code division multiple access (CDMA) cellular telephone systems provide efficient, and high quality, telephone system making such a cellular telephone system compatible with at least one CDMA cellular telephone standard would be preferred.

SUMMARY OF THE INVENTION

Based on the forgoing, a cellular telephone concentrated subscriber system (CSS) is described. The CSS includes a set of subscriber units, each having a unique electronic serial number, that is coupled to a CSS controller that provides an interface to standard base station of a cellular telephone system. The CSS controller includes a set of modulator-demodulator systems (modems) and an RF transceiver and antenna system that is specially configured to transmit sufficient information to conduct multiple telephone calls over both long and short distances. The CSS controller also includes control circuitry for coupling the set of subscriber units to the set of modems via a multiplexer system using stored information. The number of modems is significantly less the number of subscriber units which are implemented in a manner such that the per subscriber cost of the cellular telephone service is reduced.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for interfacing multiple subscriber units having unique electronic serial numbers via a concentrated subscriber system controller is provided. In the following description various procedures, arrangements, and systems are described in detail. This includes the description of a cellular telephone system operating in accordance with a particular CDMA cellular telephone specification and protocol. It will be apparent to one skilled in the art that the present invention may be practiced within a variety of cellular or wireless communication systems, although the described embodiment is preferred. Additionally, the use of an electronic serial number to identify and page a subscriber unit is also described. It will also be apparent that other unique identification code may be substituted for the electronic serial number including a mobile identification number or more generally a subscriber unit identification number. In other instances various well known structures and systems are provided in block form. This is done in order to avoid unnecessarily obscuring the disclosure of the present invention.

Figure 1:
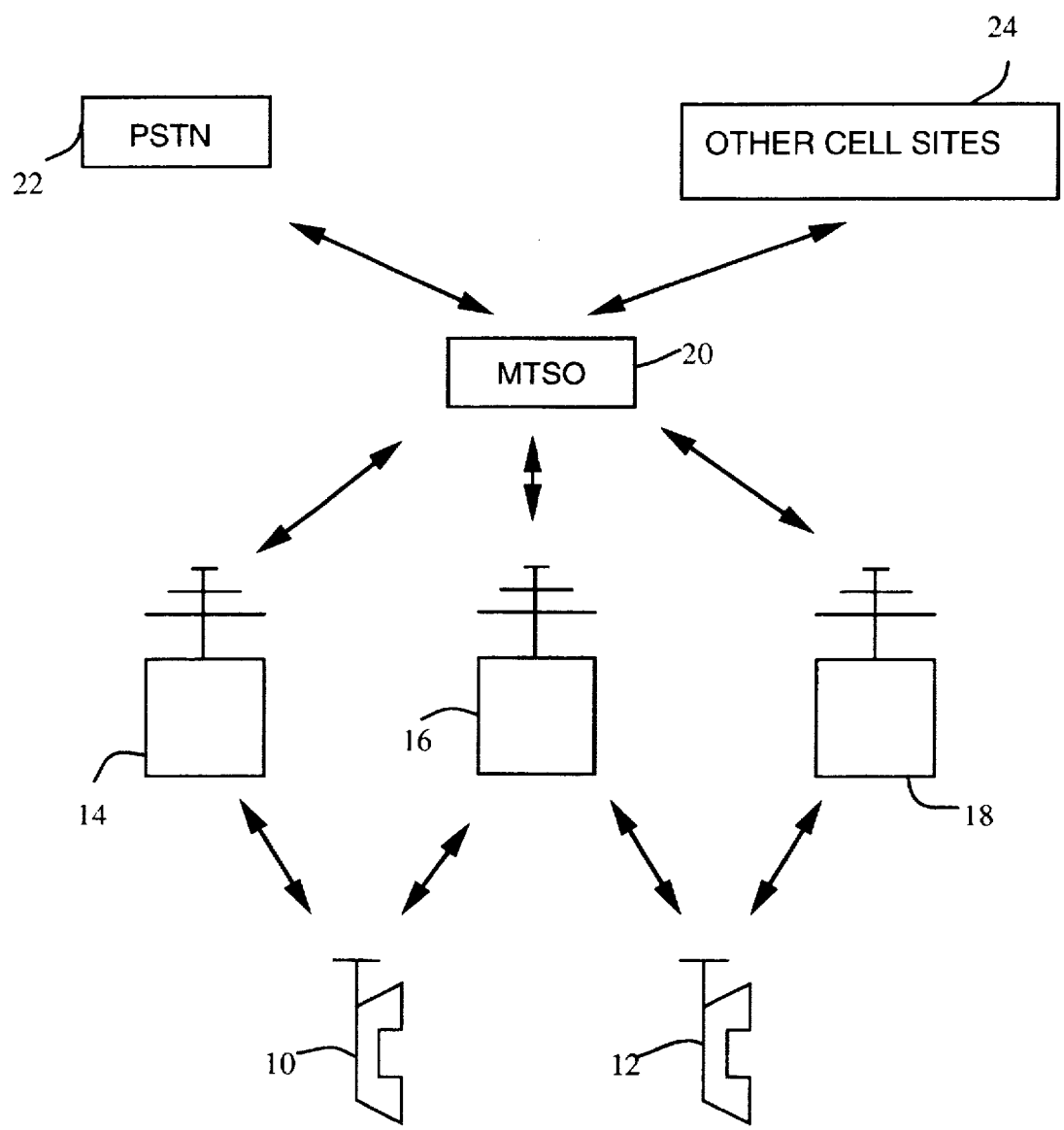
FIG. 1 is a diagram of a cellular telephone system consistent with the use of CDMA radio and modulation technique.

FIG. 1 is an illustration of a cellular telephone system configured in a manner consistent with the use of Code Division Multiple Access (CDMA) radio wave modulation techniques. One implementation for such a CDMA cellular telephone system is described in U.S. Pat. Nos. 4,901,307 ('307) entitled "Spread Spectrum Multiple Access Communication System Using a Satellite or Terrestrial Repeater" and 5,103,459 ('459) entitled "System and Method for Generating Signal Waveforms in a CDMA Cellular Telephone System" both assigned to the assignee of the present invention, the disclosures of which are incorporated by reference, as well as in specification IS-95 from the Telecommunication Industry Association (2001 Pennsylvania Avenue, Suite 800, Washington, DC 20006) entitled "Mobile Station-Base Station Compatibility Standard for Dual Mode Wideband Spread Spectrum Cellular System" (IS-95). In this cellular telephone system Radio Frequency (RF) signals generated in response to both incoming and outgoing phone calls in accordance with above referenced patents '459 and '307 and specification IS-95 are exchanged between subscriber units 10 and 12 and base station transceivers 14, 16 and 18. Additional subscriber units will normally also exchange such RF signals, but are not shown for ease of drawing. Base station transceivers 14, 16 and 18 communicate in various ways including ground base wires, fiber optic cable, or microwave link with base station controller (BSC) 20, which routes the calls through mobile switching center (MSC) 21 to public switching telephone network (PSTN) 22 and which interacts similarly with other cell sites 24. In general, subscriber units 10 and 12 each incorporate the use of a modem for converting information between digital and analog formats and a transceiver system for generating and receiving the RF signals, and can not communicate directly with one another. This converting includes packetizing, vocoding and spread spectrum encoding the data as described in the above referenced patent '459 and '307 as well as specification IS-95.

As also described in patents '459 and '307 and specification IS-95 the "forward link" communication that takes place from base station transceivers 14, 16, and 18 to subscriber units 10 and 12 is performed over various forward CDMA channels each of which occupies 1.23 MHz of radio frequency bandwidth. Each of these forward CDMA channels are divided into various additional channels that are separated and distinguished via the use of unique pseudo-random spreading codes that are applied to the data being transmitted. For channels that carry signals to be received by both subscriber units 10 and 12 a predetermined spreading code is used that is known by every communication unit including both subscriber units 10 and 12. For channels that carry data intended for only one subscriber units 10 or 12 a spreading code only known to that particular communication unit is used which is generally determined as a function of a unique thirty-two bit electronic serial number (ESN) stored in each subscriber unit. In addition to the ESN, each subscriber unit may also be associated with a mobile identification number (MIN), which in the preferred embodiment is also 32 bits, as well as other unique identification codes which can generally be referred to as subscriber unit identification codes.

The various channels within a given forward CDMA channel include a set of data channels, a synchronization channel, a pilot channel, and a set of paging channels, all transmitted from base station transceivers 14, 16 and 18 to subscriber units 10 and 12. The pilot signal is a regularly repeated pattern that is phase offset slightly for each cell site in a local area and is received by both subscriber units 10 and 12. The pilot signal allows subscriber units 10 and 12 to identify and become synchronized with the various base station transceivers that are within range of their communication capability. The synchronization channel provides additional synchronization information for use by both subscriber units 10 and 12. The set of data channels carry the data associated with the various communication sessions (usually phone calls) and are directed to a specific subscriber unit. The paging channels are used by the base station transceivers to notify a particular subscriber unit that a request to communicate has been received. The paging channel are directed to a subset of the subscriber units located within a particular cell site.

As also described in patent '459 and specification IS-95 as well as in co-pending U.S. patent application Ser. No. 07/847,149 ('149) entitled "Apparatus and Method for Reducing Power Consumption in a Mobile Communications Receiver" assigned to the assignee of the present invention and also incorporated herein by reference, the protocol for paging a subscriber unit is defined so as to evenly distribute background noise and to reduce power consumption. This is done by dividing each paging channel into a set of paging "slots" or time windows during which paging signals directed to either subscriber units 10 and 12 may be generated, and by assigning particular CDMA channels, paging channels and paging slots to each subscriber unit in an evenly distributed fashion. This assignment is performed via the use of a hashing function applied to the ESN of each subscriber unit. The hashing function yields a value that corresponds to a particular set of paging parameter including a CDMA channel, paging channel, and paging slot. The subscriber units are then configured to "listen" for a paging message over that CDMA channel and paging channel during the corresponding paging slot. Since listening for a page requires a certain amount of power, limiting the time a subscriber unit performs the listening function to a particular paging slot reduces the overall power consumption of that subscriber unit and therefore increases the life of any battery or other power storage system utilized by that subscriber unit. The page message itself will contain the subscriber unit identifying information which in the established protocol is ESN of the subscriber unit being paged in encoded form so that unit can identify itself when the page is received.

The CDMA cellular telephone protocol described in the above referenced patents '459 and '307 and specification IS-95 also contains a power control function that facilitates the ability of base station 14, 16 and 18 to distinguish and decode the information transmitted from each of the subscriber units within in cell of area of coverage. The power control function incorporates the use of a feedback loop in which, for example, base station 14 indicates to subscriber unit 10 through the RF signals exchanged between them whether it should increase or decrease the strength of its RF output signal. Further details on an exemplary power control system are disclosed in U.S. Pat. No. 5,056,109 entitled "Method and Apparatus for controlling transmission power in a CDMA Cellular Mobile Telephone System." By providing this power control capability the strength of the signals transmitted from each subscriber unit within the area of coverage of base station 14 will be similar when received by base station 14. This makes the decoding and distinguishing of the various channels less difficult by minimizing the amount of interference generated between the signals within the cell. Within each subscriber unit 110 and 112 the modem performs the page monitoring function as well as the function of distinguishing the various channels from one another in order to determine the information directed to the subscriber system in which it is located.

Figure 2:
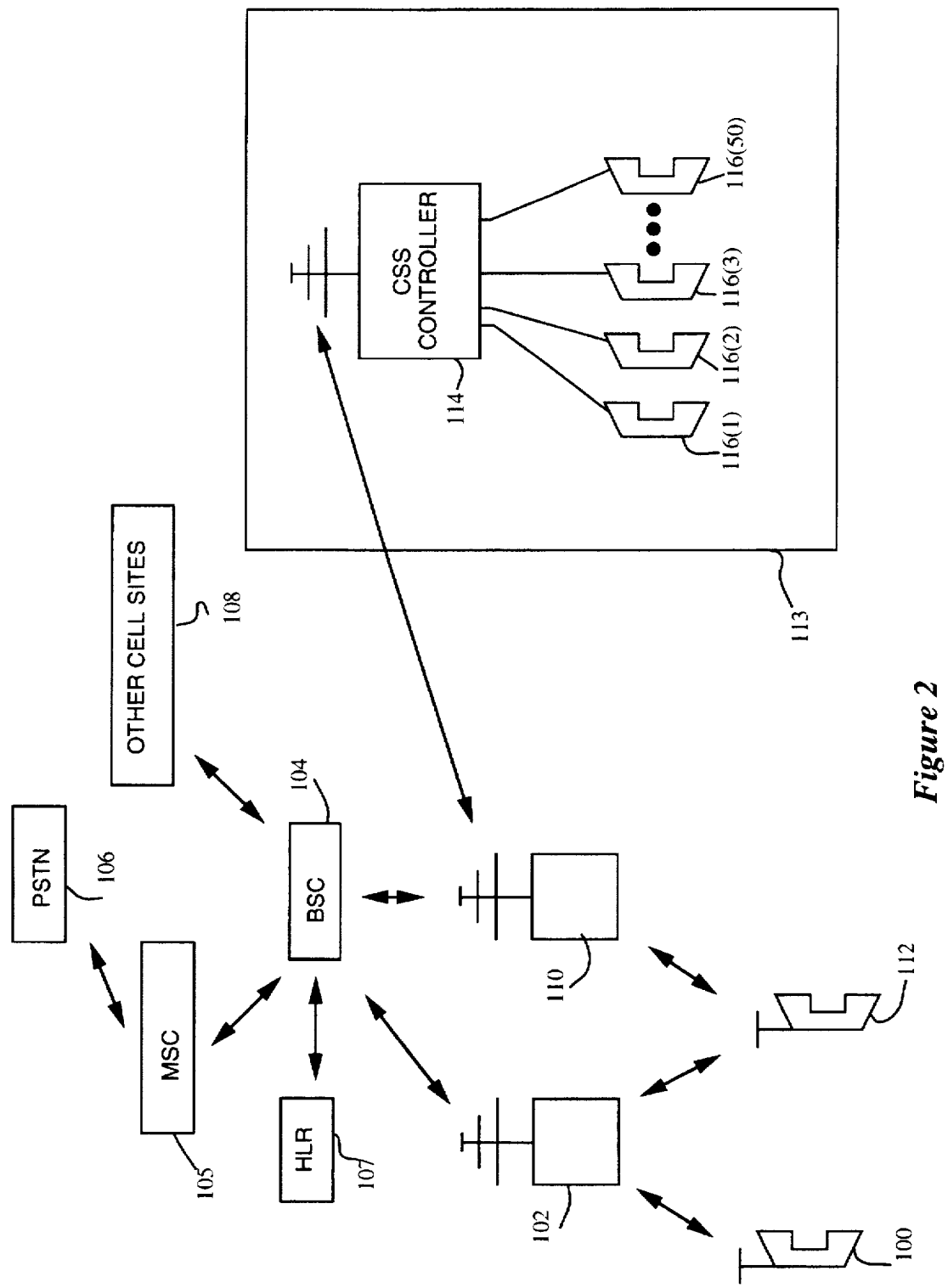
FIG. 2 is a diagram of a cellular telephone system configured in accordance with one embodiment of the invention.

FIG. 2 is a block diagram of a cellular telephone system configured in accordance with one embodiment of the present invention. Base station transceiver 102 transmits and receives radio waves modulated in accordance with the CDMA spread spectrum techniques described in above referenced patent '459 and '307 and specification IS-95 to and from subscriber units 100 and 112. Additionally, base station transceiver 102 interfaces with base station controller (BSC) 104 in any one of a variety of manners including microwave link, ground based T1 or E1 wire connections, or a combination thereof. BSC 104 interfaces with public telephone switching network (PSTN) 106 through mobile switching center (MSC) 105 allowing various communication sessions or telephone calls to be delivered between base station transceiver 102, base station transceiver 110, and other cell sites 108. Each of remote communication units 100 and 112 are assigned a unique thirty-two bit ESN as described above.

Base station transceiver 110 interfaces with BSC 104 in a similar manner to base station transceiver 102, and communicates with remote communication unit 112 and concentrated subscriber system (CSS) 113 via radio waves modulated in accordance with above referenced patent '459 and '307 and specification IS-95. Within CSS 113 subscriber units 116(1) through (50) are coupled to CSS controller 114 which performs the interface function with base station transceiver 110. Subscriber units 116(1) through (50) generally lack the circuitry necessary to transmit and receive radio waves and to modulate and demodulate data from digital to analog format and essentially consist of a speaker and microphone similar to the handset found in most wire based telephones. In one embodiment of the invention subscriber units 116 will be standard telephone sets used to provide conventional wire based, pulse code modulated, telephone service and will have twisted pair or PBX style connections. Each subscriber unit 116 is also assigned a unique ESN and can be used in a manner similar to a standard telephone to initiate and receive telephone calls. While CSS controller 114 is shown coupled directly to subscriber units 116 alternative methods for exchanging information are contemplated including a simplified form of radio wave based communication. Additionally, alternative numbers of subscriber units 116 may be coupled to CSS controller 114 other than the fifty units indicated.

During operation base station transceiver 110 receives requests to communicate with subscriber unit 100 and 112 and subscriber units 116 as well as other subscriber units not shown for ease of drawing. In response to a request to communicate with subscriber unit 112 base station transceiver 110 generates a paging message on a CDMA channel, paging channel, and paging slot determined by the application of a hashing function to the ESN of remote communication unit 112. The hashing function is designed to evenly distribute the set paging signals generated over the available paging channels and paging slots and is described in above referenced patent '459, patent application '159, and specification IS-95. It should be understood that alternative methods of paging subscriber units 112 or 100 are consistent with the use of the present invention.

When a request is received by base station transceiver 110 to communicate with one of subscriber units 116 (1) though (50) a page message is generated on a particular CDMA channel, paging channel and paging slot determined in an alternative manner to that used for subscriber units 100 and 112 that will cause the same CDMA channel, paging channel and paging slot to be utilized for every subscriber unit 116. The generation of this paging message is described in further detail in concurrently filed and co-pending U.S. patent application Ser. No. 08/382,472 entitled "Method and Apparatus for Paging a Concentrated Subscriber System for Wireless Local Loop" assigned to the assignee of the present invention ("Paging Patent"). This paging signal will be received by CSS controller 114 which will notify the corresponding modified remote communication unit 116 in response, and thereafter transfer all additional data related to the associated communication session or phone call to that subscriber unit 116.

Figure 3:
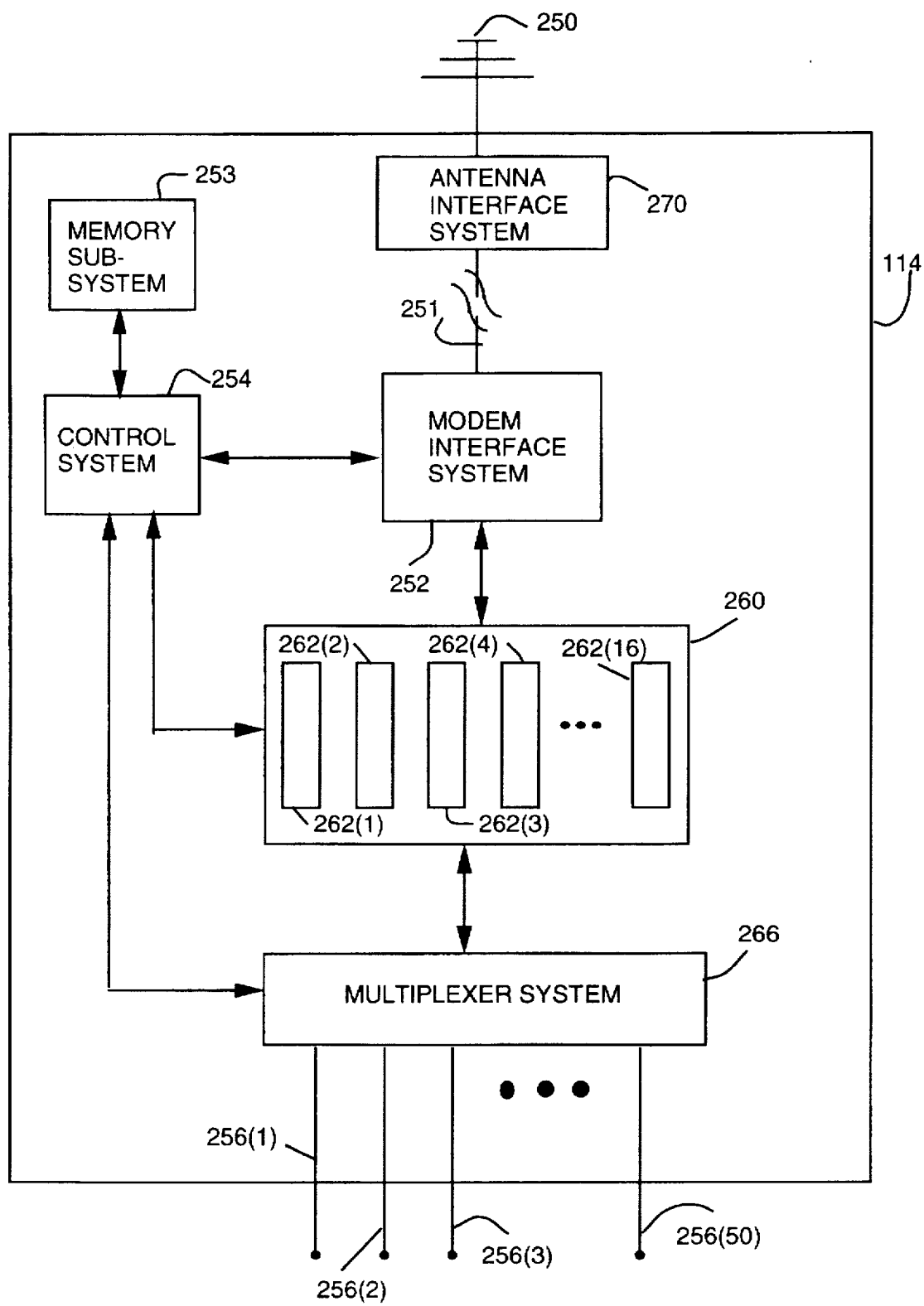
FIG. 3 is a block diagram of a concentrated subscriber system controller configured in accordance with the described embodiment of the invention.

FIG. 3 is a block diagram of CSS controller 114 of FIG. 2 configured in accordance with the described embodiment of the invention. Antenna interface system 270 receives the radio waves from base station transceiver 110 through antenna 250 and transmits these signals through cable 251 and modem interface system 252 to modem bank 260 which is comprised of modems 262(1) through (16). In the preferred embodiment modems 262 will be similar in structure and functionality to the modem used in the subscriber system 110 or 112 of FIG. 1 in order to reduce the cost of developing the CSS controller, although the use of alternative modems is consistent with many aspects of the invention. A transceiver sub-system is formed within the concentrated subscriber system by antenna 250, antenna interface system 270 and modem interface system 252. Many transceiver sub-systems are known in the art and one implementation of a transceiver sub-system is described in further detail in co-pending U.S. patent application Ser. No. 08/398,619 entitled "Radio Frequency Transceiver System for Digital Communication" assigned to the assignee of the present invention. Multiplexer system 266 couples subscriber unit lines 256(1) through (50) to modems 262(1) through (16) of modem bank 260 and in the preferred embodiment is configured to interact with subscriber units 116 configured as standard pulse code modulated and wire based telephone sets, although other wire based telephones sets are also contemplated. As shown in FIG. 2 subscriber unit lines 256 are coupled to subscriber units 116. Control system 254 receives and provides information to modem bank 260 and controls multiplexer system 266 using information stored in memory sub-system 253. Additionally, control system 254 is coupled to modem interface system 252. While sixteen modems and fifty cellular communication lines are shown the use of different numbers of these elements is consistent with the operation of the invention. Also, additional circuitry for manipulating the signals from subscriber units 116 may be placed between modem bank 260 and subscriber unit lines 256 that are well known in the art including analog to pulse code modulated (PCM) conversion systems.

During operation control system 254 designates one of modems 262 to monitor for paging messages transmitted over the RF signals received by antenna 250 and provides that modem 262 with page monitoring information necessary to perform the page monitoring function in accordance with the various simplified page message generation techniques described in the above referenced Paging Patent. In the preferred embodiment, this page monitoring information includes a paging-ESN which is a thirty-two bit number similar to the ESN of a subscriber unit the value of which is determined in accordance with a variety of alternative embodiments of the invention. In one embodiment of the invention the paging-ESN is a special predetermined value that is the same for all CSS systems. In a second embodiment of the invention the paging-ESN is a special predetermined number that is unique for each CSS system. In a third embodiment of the invention the paging-ESN is also a predetermined number that is unique for each CSS, however, the number selected must have a set of twenty high order bits that is identical to the twenty high order bits of the ESN of each subscriber unit that is part of that particular CSS. In other variations of this third embodiment of the invention the number of bits that are identical between the paging-ESN and the ESN of each subscriber units can be something other than twenty, and may be located somewhere else within the thirty two bits available other than the high order bits. However, twenty is the preferred number because it provides twelve bits of uniqueness between the ESN of each subscriber unit which allows for over ten thousand unique codes to exist within a CSS which corresponds to a four digit base ten extension which is common in the telecommunications industry.

Once the paging-ESN has been provided by control system 254 the designated modem 262 proceeds to listen for pages messages on a CDMA channel, paging channel, and paging slot that are calculated by applying the standard hashing function to the paging-ESN. The CDMA channel, paging channel and paging slot comprise the paging parameters in the preferred embodiment since IS-95 compliant CDMA cellular telephone technology is utilized. Other embodiments may incorporate different paging parameters in accordance with any alternative cellular telephone protocols or standards utilized. Additionally, these other cellular telephone protocols and standards may utilize different method of calculating their respective paging parameters as well as different page monitoring information. When a page message is received by the designated modem 262 the ESN of the subscriber unit being paged contained therein is provided to control system 254 and an acknowledge message is transmitted on an alternative data channel determined in accordance with the normal operation of the IS-95 CDMA cellular telephone system. In response to the page information control system 254 determines if the ESN contained in the page message corresponds to a subscriber unit that is part of the CSS. This determination is done using data stored in memory sub-system 253.

If the ESN contained in the page message corresponds to a subscriber unit contained in the CSS control system 254 further determines if a modem 262 is available to process the information associated with the requested telephone call. If a modem is available control system 254 designates that modem 262 to handle the telephone call and provides that modem with encoding information necessary to conduct the telephone call associated with the paging message. The modem then uses this information to place data from the subscriber unit 116 in condition for transmission via RF signals, and to place the data from the modem interface into condition to be used by multiplexer system 266 as well as subscriber unit 116. In the preferred embodiment this conversion encompasses vocoding, packetizing, and modulating the information as well as the corresponding deconversion, and the encoding information includes the ESN received in the page message which is associated with the subscriber unit 116 all of which is described above referenced patents '459 and '307 and specification IS-95. Other embodiments of the invention may use different encoding information and incorporate different encoding processes in accordance with their respective protocols. Additionally, control system 254 instructs multiplexer system 266 to couple one of cellular communication lines 256(1) through (50) to the designated modem 262. The appropriate line 256 will be the one coupled to the subscriber unit associated with the ESN contained in the paging message. The telephone call is then conducted using the designated modem 262 until completion at which time the modem 262 notifies control system 254 that it is available for further call processing.

If at the time that page message is received control system 254 determines that no additional modems are available for conducting telephone calls the modem previously designated to monitor for page messages is redesigned to processing the telephone call associated with the incoming page message and provided with the encoding information including the ESN of the associated subscriber unit. No response will be provided to any additional paging messages indicating the CSS is busy. Once a telephone call is completed and a modem becomes available to process telephone calls again that modem will be designated by control system 254 to monitor for paging messages and provided with the paging-ESN.

Normally, pages will not be received that are directed to subscriber units that are in use because the base station controller will determine the subscriber unit with which communication is being requested is in use, and will therefore return a busy signal without generating a page message in response. However, if the subscriber unit of a concentrated subscriber system has been left disconnected, i.e. "off the hook", but is not in use the base station controller will not be aware of this unavailability and will generate a page message. In this case control system 254 will detect the subscriber unit being off the hook and return a message indicating the subscriber unit is not available which can be responded to in various ways including the generation of a busy signal by the base station controller.

For outgoing telephone calls control system 254 detects when a subscriber unit 116 (FIG. 2) is activated through multiplexer system 266. Activation of the subscriber unit usually corresponds to removing a handset from a cradle as with a standard telephone. Once activation is detected control system 254 determines if a modem 262 is available to process a telephone call. If a modem is available control system 254 provides a dial tone like signal to the activated subscriber unit 116. Additionally, a modem 262 is designated to process the telephone call and provided with the encoding information associated with that subscriber unit including the ESN of the activated subscriber unit. Once the encoding information has been provided the activated subscriber unit 116 is coupled to the designated modem 262 through multiplexer system 266. The call is then processed in the normal fashion with the data being modified using a spreading code that is a function of the ESN. This modified data is provided to modem interface system 252 which combines the data with data from other outgoing telephone calls into an amplified output signal that is forwarded through cable 251 to antenna interface system 276 and then transformed into an RF signal that is transmitted through antenna 250 to base station transceiver 110 of FIG. 2.

Control system 254 provides a power demand reduction function that enhances its ability to operate with various types of transceiver systems including the one described in the above referenced co-pending application entitled "Radio Frequency Transceiver System for Digital Communication". If the transceiver sub-system comprised of antenna 250, antenna interface system 276 and modem interface system 252 asserts a power alarm signal indicating the transceiver system is being overloaded, and this power alarm signal is detected by control system 254, control system 254 will take various steps to reduce the power demands of the concentrated subscriber system. To properly interact with control system 254 the power alarm signal should be asserted and maintained so long as the power output requirements of the concentrated subscriber system exceed a predetermined level that corresponds to the capabilities of antenna interface system 276. In response to the power alarm signal control system 254 first instructs modems 262 to ignore requests to increase power output received from base station 110, and then begins to monitor the power alarm signal with increased regularity to determine if it is a "fast-fade", or "slow-fade" alarm. If the power alarm signal is deserted and remains so for a predetermined period of time then the power alarm is determined to be a fast-fade signal and requests to increase power output will be responded to once again. If the power alarm signal remains asserted or is reasserted within the predetermined period of time the power alarm is determined to be a slow-fade and additional action must be taken. The proper predetermined period of time should be ascertained through experimentation and the application of fast-fade, slow-fade theory which is known in the art.

In response to a slow-fade power alarm control system 254 first disables outgoing calls and incoming page responses and instructs modems 262 to reduce the rate of transmission by 12.5% or one-eighth, thereby reducing the power requirements of each modem, but also causing a slight degradation in voice quality. Should the power alarm signal remain asserted or be reasserted while the reduced transmission rates are in effect control system 254 will then cause telephone calls to be terminated in a random fashion until the power alarm is deserted. In another embodiment of the invention certain calls will be given priority in the termination process with the priority being granted on the basis of the number being called, for example 911 which is the emergency number in many areas, or on the basis of the ESN of the subscriber unit giving telephone calls from certain users higher priority over other telephone calls.

The above described concentrated subscriber system provides non-mobile wireless cellular telephone services at a reduced cost when compared to traditional cellular telephone systems while maintaining the reduced capital and infrastructure requirements characteristic of such telephone systems. The modem allocation scheme allows a sub-set of modems to be utilized by a larger set of telephone service subscribers. This spreads the cost of the modems across a larger number of users thereby reducing the per user cost of telephone service. Additionally, the ability of the above described concentrated subscriber system to control its power output requirements in response to signals from a transceiver system allows CDMA modems to be utilized in conjunction with a single RF transceiver system. This further decreases the operating cost of the cellular telephone service because CDMA cellular telephone systems utilize the available RF bandwidth more efficiently than other cellular telephone systems, and the cost of the single RF transceiver system can also be shared by the multiple subscribers. Reducing the operating cost of wireless and cellular telephone service increases the number of areas in which the use of a cellular and wireless telephone systems is both economical and profitable and thereby increases overall worldwide access to telephone service improving the economic, physical and political well being of those who presently lack access to such telephone service. Since the actual link to the telephone network is performed using RF signals the need for the capital intensive wire base connections of conventional telephone systems is avoided thereby allowing the above described concentrated subscriber system to retain the characteristic of reduced capital and infrastructure requirements. This allows telephone service to be introduced using the above described concentrated subscriber system more quickly in areas where wire based telephone will not be available for a substantial period of time.

Thus, a concentrated subscriber system for wireless local loop that allows a cellular telephone system to provide lower cost telephone service while retaining reduced capital and infrastructure requirements of cellular telephone systems is described. Various alternative embodiments of the invention will be apparent to one skilled in the art. The exemplary embodiment provided above is merely for purposes of illustration and should not be taken as limiting the scope of the invention.

We claim:

1. A concentrated subscriber system for providing telecommunications service to a set of subscriber units comprising:

an RF transceiver system for transmitting and receiving radio wave frequency signals;

a set of modems for interfacing said set of subscriber units with said RF transceiver system, said set of modems having fewer modems than said set of subscriber units has subscriber units;

a control system for, receiving paging information including an intended subscriber unit from one of said set of modems, determining if said intended subscriber unit is part of said concentrated subscriber system, supplying encoding information associated with said intended subscriber unit to a modem from said set of modems, coupling said modem to said intended subscriber unit using said multiplexer; and providing a modem from said set of modems with page monitoring information, wherein said modem monitors for a page message generated in accordance with said page monitoring information.

2. The concentrated subscriber system as set forth in claim 1 wherein said modem:

notifies said controller system when said page is received; and supplies said controller system with said paging information contained in said page message.

3. The concentrated subscriber system as set forth in claim 2 wherein said modems:

convert input data into packetized and encoded and compressed digital output data using said encoding information; and convert input packetized, encoded and compressed digital input data into output data using said encoding information.

4. The concentrated subscriber system as set forth in claim 2 comprising:

an RF transceiver system for transmitting and receiving radio wave frequency signals:

a set of modems for interfacing said set of subscriber units with said RF transceiver system, said set of modems having fewer modems than said set of subscriber units has subscriber units:

a multiplexer system for coupling said set of subscriber units to said set modems:

a control system for receiving paging information including an intended subscriber unit from one of said set of modems, determining if said intended subscriber unit is part of said concentrated subscriber system, supplying encoding information associated with said intended subscriber unit to a modem > from said set of modems, and coupling said modem to said intended subscriber unit using said multiplexer, wherein said control system, receives a power alarm signal;

instructs said modems maintain power requirements at present levels or less;

reduces the transmission rate of each of said modems if said power alarm remains asserted; and terminates a telephone call if said power alarm remains asserted.

5. The concentrated subscriber system as set forth in claim 2 wherein said encoding information comprises an electronic serial number.

6. The concentrated subscriber information as set forth in claims 2 wherein said page monitoring information comprises a paging ESN.

7. A method for operating a concentrated subscriber system for wireless local loop having a set of subscriber units comprising the steps of:

a) monitoring for a page message generated in accordance with paging parameters using a first modem;

b) determining that said page message is directed to a subscriber unit from said set of subscriber units; and c) conducting a communication session with said subscriber unit using a second modem.

8. The method as set forth in claim 7 wherein step a) comprises the steps of:

a.1) designating said first modem to monitor for page message;

a.2) providing said modem with page monitoring information;

a.3) calculating said paging parameters using said page monitoring information; and a.4) monitoring for a page message generated in accordance with said page parameters.

9. The method as set forth in claim 7 wherein step b) comprises the steps of:

b.1) receiving said paging message having an intended subscriber unit; and b.2) comparing said intended subscriber unit to the set of subscriber units.

10. The method as set forth in claim 7 wherein step c) further comprises the steps of:

c.1) providing said encoding information to a second modem; and c.2) conducting a communication session with said subscriber unit using said second modem.

11. The method as set forth in claim 10 wherein step c.2) comprises the steps of:

calculating a spreading code as a function of said encoding information; and coupling said second modem to said subscriber unit.

12. The method as set forth in claim 7 further comprising the step of transmitting a busy message when a subscriber unit is disconnected but not in use.

13. The method as set forth in claim 7 further comprising the step of:

providing a modem with the encoding information of a third subscriber unit from said set of subscriber units when an activation signal is received.

14. The method as set forth in claim 7 further comprising the steps of:

receiving a power alarm signal;

disables outgoing and incoming telephone calls instructs said modems maintain power requirements at present levels or less;

reducing the transmission rate of said first and second modem if said power alarm signal remains asserted; and terminating a telephone call if said power alarm signal remains asserted.

15. A concentrated subscriber system for wireless local loop having a subscriber unit comprising:

a first modem for monitoring for page messages and for conducting a communication session with a subscriber unit; and a control system for determining that said page message is directed to a subscriber unit from said set of subscriber units.

16. The concentrated subscriber system as set forth in claim 15 wherein:

said control system designates said first modem to monitor for page message and provides said modem with page monitoring information; and said first modem calculates said paging parameters using said page monitoring information and monitors for a page message generated in accordance with said page parameters.

17. The concentrated subscriber system as set forth in claim 15 wherein said control system receives said paging message having an intended subscriber unit information and compares said intended subscriber unit information with said set of subscriber units.

18. The concentrated subscriber system as set forth in claim 15 wherein:

said control system provides encoding information to a second modem in response to a page message; and said second modem conducts a communication session with said subscriber unit using said encoding information.

19. The concentrated subscriber system as set forth in claim 18 further comprising a multiplexer unit for coupling said second modem to said subscriber unit.

20. The concentrated subscriber system as set forth in claim 15 wherein said control system transmits a busy message when a subscriber unit being paged is disconnected, but not in use.

21. The concentrated subscriber system as set forth in claim 15 wherein said control system provides a third modem with encoding information associated with a third subscriber unit from said set of subscriber units when an activation signal is received.

22. The apparatus as set forth in claim 15 wherein said control system:

receives a power alarm signal;

instructs said modems maintain power requirements at present levels or less;

reduces the transmission rate of said first and second modem if said power alarm signal remains asserted; and terminates a telephone call if said power alarm signal remains asserted.

* * * * *